(12) United States Patent
Otto et al.

(10) Patent No.: US 7,104,502 B2
(45) Date of Patent: Sep. 12, 2006

(54) ICE DETECTOR FOR IMPROVED ICE DETECTION AT NEAR FREEZING CONDITION

(75) Inventors: John Timothy Otto, Shakopee, MN (US); Joseph Michael Fanska, Burnsville, MN (US); Kenneth James Schram, Eden Prairie, MN (US); John Albert Severson, Eagan, MN (US); David George Owens, Bloomington, MN (US); Dennis James Cronin, Shakopee, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 50 days.

(21) Appl. No.: 10/814,939

(22) Filed: Mar. 31, 2004

(65) Prior Publication Data

US 2005/0218268 A1    Oct. 6, 2005

(51) Int. Cl.
B64D 15/20        (2006.01)
(52) U.S. Cl. .................... 244/134 F; 702/127; 340/580
(58) Field of Classification Search ............ 244/134 F; 340/580, 581; 702/127
See application file for complete search history.

(56) References Cited

U.S. PATENT DOCUMENTS

| | | | |
|---|---|---|---|
| 2,359,787 A | 10/1944 | Peters et al. | |
| 2,414,756 A | 1/1947 | May | 177/311 |
| 2,670,912 A * | 3/1954 | Lindsey et al. | 244/134 F |
| 2,724,106 A * | 11/1955 | Fraser | 340/580 |
| 2,766,619 A | 11/1956 | Tribus et al. | 73/170 |
| 2,775,678 A | 12/1956 | Flubacker | 219/19 |
| 2,775,679 A | 12/1956 | Flubacker | 219/20 |
| 2,800,647 A | 7/1957 | Baerwald et al. | 340/234 |
| 3,000,213 A | 9/1961 | Eves et al. | 73/349 |
| 3,240,054 A | 3/1966 | Roth | 73/67.1 |
| 3,276,254 A * | 10/1966 | Richard | 73/170.26 |
| 3,277,459 A * | 10/1966 | Werner | 340/581 |
| 3,341,835 A | 9/1967 | Werner et al. | 340/582 |
| 3,541,540 A | 11/1970 | Hughes | 340/582 |
| 3,594,775 A | 7/1971 | Fox | 340/234 |
| 4,036,457 A | 7/1977 | Volkner et al. | 244/134 |
| 4,037,427 A | 7/1977 | Kramer | 62/128 |
| 4,054,255 A | 10/1977 | Magenheim | 244/134 |
| 4,092,862 A | 6/1978 | Taylor | 73/362 |
| 4,210,021 A | 7/1980 | Vykhodtsev et al. | 73/170 |

(Continued)

FOREIGN PATENT DOCUMENTS

EP    1 396 425 A1    3/2004

(Continued)

OTHER PUBLICATIONS

Messinger, B., "Equilibrium Temperature of an Unheated Icing Surface as a Function of Air Speed", J. Aeronaut. Sci., pp. 29-42, Jan. 1953.

(Continued)

*Primary Examiner*—Tien Dinh
(74) *Attorney, Agent, or Firm*—John D. Veldhuis-Kroeze; Westman, Champlin & Kelly, P.A.

(57) ABSTRACT

An ice detector for providing a signal indicating ice formation includes a probe protruding into an airflow. The probe extends into the airflow from a strut. The strut has one or more features which allow the probe to accrete ice at a higher temperature than would conventionally be possible. Strut features can include a notch formed therein in an upwind direction relative to the probe, and a curved surface adjacent a point of extension of the probe from the strut.

6 Claims, 13 Drawing Sheets

U.S. PATENT DOCUMENTS

| | | | |
|---|---|---|---|
| 4,327,286 A | 4/1982 | Thoma | 250/231 |
| 4,333,004 A | 6/1982 | Forgue et al. | 219/497 |
| 4,367,399 A | 1/1983 | Anthony et al. | 219/497 |
| 4,461,178 A | 7/1984 | Chamuel | 73/599 |
| 4,553,137 A * | 11/1985 | Marxer et al. | 340/582 |
| 4,570,881 A | 2/1986 | Lustenberger | 244/134 F |
| 4,611,492 A | 9/1986 | Koosmann | 73/579 |
| 4,640,127 A | 2/1987 | Schneider | 73/295 |
| 4,755,062 A | 7/1988 | Meyer | 374/16 |
| 4,897,527 A | 1/1990 | Cripps et al. | 219/492 |
| 4,980,673 A | 12/1990 | Kleven | 340/581 |
| 5,003,295 A | 3/1991 | Kleven | 340/581 |
| 5,140,135 A | 8/1992 | Freeman | 219/497 |
| 5,752,674 A | 5/1998 | Mears et al. | 244/134 |
| 5,821,862 A | 10/1998 | MacKenzie | 340/583 |
| 5,955,887 A | 9/1999 | Codner et al. | 324/689 |
| 6,010,095 A | 1/2000 | Hackmeister | 244/134 |
| 6,052,056 A | 4/2000 | Burns et al. | 340/583 |
| 6,196,500 B1 | 3/2001 | Al-Khalil et al. | 244/134 |
| 6,269,320 B1 * | 7/2001 | Otto | 702/127 |
| 6,320,511 B1 | 11/2001 | Cronin et al. | 340/580 |
| 6,425,286 B1 | 7/2002 | Anderson et al. | 73/170.26 |
| 2004/0231410 A1 | 11/2004 | Bernard et al. | 73/170.26 |

FOREIGN PATENT DOCUMENTS

| | | |
|---|---|---|
| EP | 1 533 228 A1 | 5/2005 |
| GB | 2 124 764 A | 7/1983 |

OTHER PUBLICATIONS

Ligrani et al., P. M., "Comparison of Heat-Transfer Augmentation Techniques", American Institute of Aeronautics and Astronautics Journal, vol. 41, No. 3, pp. 337-362, Mar. 2003.

Žukauskas et al., A., "Heat Transfer of a Cylinder in Crossflow", Hemisphere Publishing Corporation, 1985.

* cited by examiner

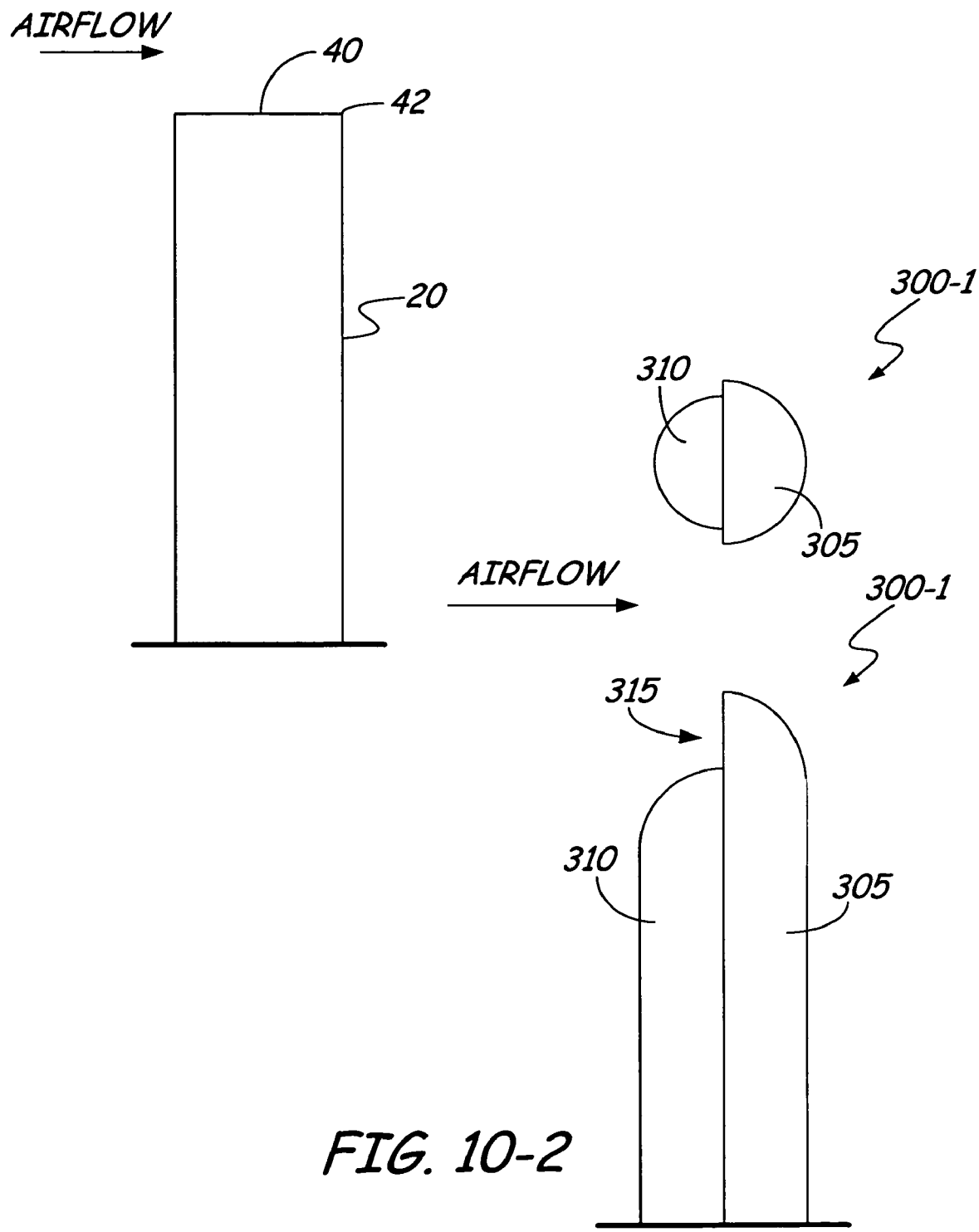

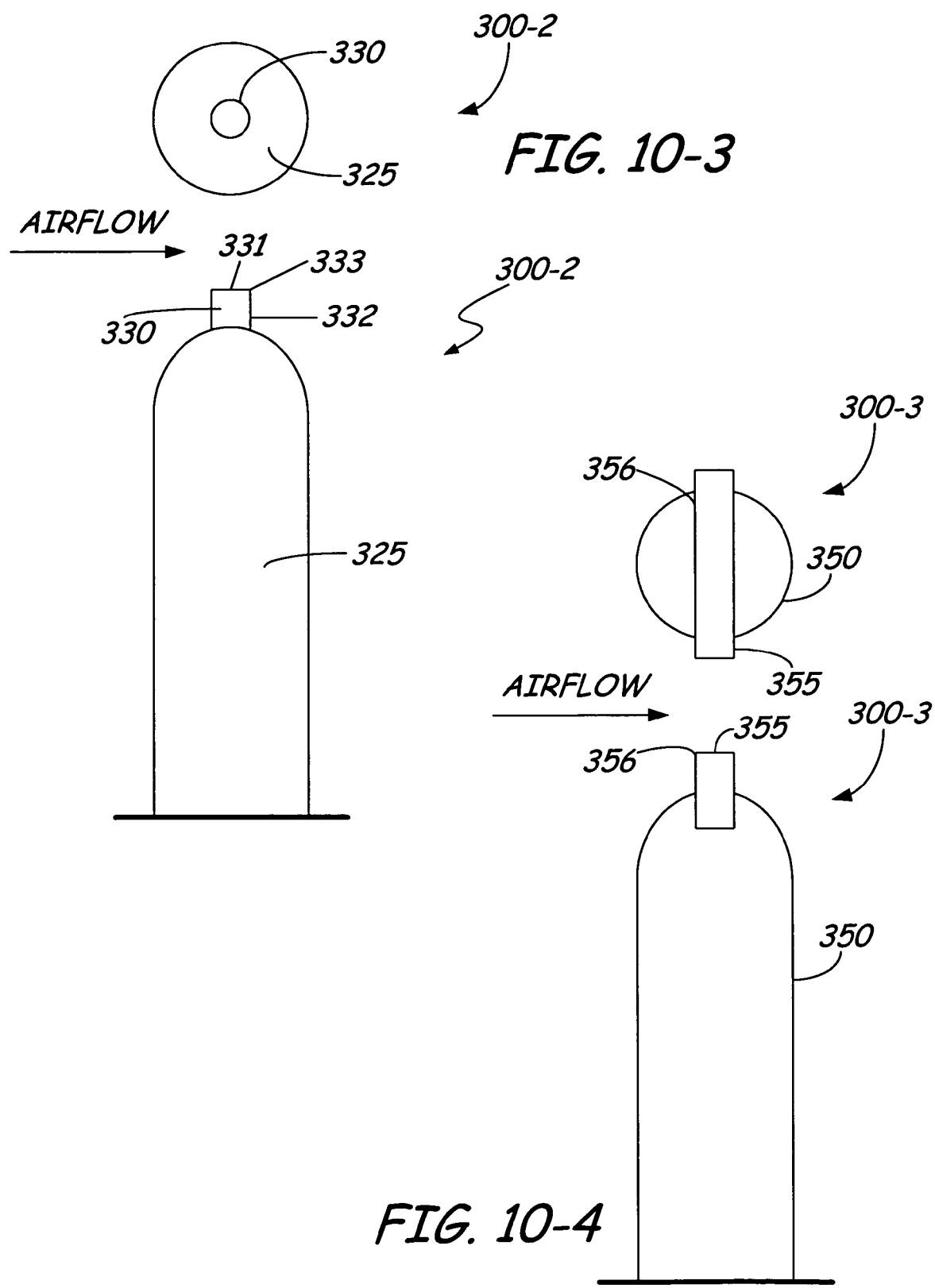

ICE DETECTOR FOR IMPROVED ICE DETECTION AT NEAR FREEZING CONDITION

CROSS-REFERENCE TO RELATED APPLICATIONS

Reference is hereby made to the following co-pending and commonly assigned patent application: U.S. application Ser. No. 10/814,384, filed Mar. 31, 2004, entitled "ICE DETECTOR FOR IMPROVED ICE DETECTION AT NEAR FREEZING CONDITION", which is incorporated by reference in its entirety.

BACKGROUND OF THE INVENTION

The present invention relates to vibrating type ice detectors for use with aircraft and in any other locations where the detection of ice is of importance. More particularly, the present invention relates to ice detector configurations that increase the critical temperature limit of an ice detector probe to provide earlier ice detection.

Existing ice detectors are useful in near freezing temperature conditions for detecting the formation of ice on the detector, and providing a warning of the ice formation prior to the formation of ice on the wings, engine nacelles, and other control surfaces of an aircraft. A frequently used type of ice detector is a vibrating ice detector. Vibrating type ice detectors use a vibrating probe upon which ice accumulates. Typically, the probe is a cylindrical probe having a hemispherical end. Examples of vibrating type ice detectors are described, for example, in U.S. Pat. No. 3,341,835 entitled ICE DETECTOR by F. D. Werner et al.; U.S. Pat. No. 4,553,137 entitled NON-INSTRUSIVE ICE DETECTOR by Marxer et al.; U.S. Pat. No. 4,611,492 entitled MEMBRANE TYPE NON-INTRUSIVE DETECTOR by Koosmann; U.S. Pat. No. 6,269,320 entitled SUPERCOOLED LARGE DROPLET ICE DETECTOR by Otto; and U.S. Pat. No. 6,320,511 entitled ICE DETECTOR CONFIGURATION FOR IMPROVED ICE DETECTION AT NEAR FREEZING CONDITIONS by Cronin et al., which are herein incorporated by reference in their entirety.

The ability of ice detectors to provide a warning of ice formation prior to formation of ice on the wings, engine nacelles, or other control surface of an aircraft is dependent upon the critical temperature of the ice detector probe and the critical temperature of the aircraft wings or control surface. The critical temperature is defined as the ambient static temperature at or above which none of the supercooled liquid water droplets in a cloud will freeze when they impinge on a structure. Stated another way, the critical temperature is the temperature above which no ice will form (or below which ice will form) on a structure (such as an aircraft wing or an ice detector probe) given its configuration and other atmospheric conditions. The critical temperature can be different for different structures, and specifically for a typical airfoil configuration and for a conventional ice detector, at the same airspeed.

Since the critical temperature of an ice detector probe is the temperature below which ice will begin to form on the probe, thus defining the upper temperature limit at which the ice detector will not detect icing conditions, it is of significant interest in the design of ice detectors. Ensuring that the critical temperature of the ice detector probe is above the critical temperature of the wings or other control surfaces of an aircraft is a continuing challenge, particularly with newer airfoil designs. Therefore, a vibrating type ice detector having a probe with an increased critical temperature would be a significant improvement in the art. Other ice accretion improving features would similarly be significant improvements in the ice detector art.

The present invention addresses one or more of the above-identified problems and/or provides other advantages over prior art ice detectors.

SUMMARY OF THE INVENTION

An ice detector for providing a signal indicating ice formation includes a probe protruding into an airflow. The probe extends into the airflow from a strut. The strut has one or more features which allow the probe to accrete ice at a higher temperature than would conventionally be possible. Also, the probe can include surface roughness features that further improve ice detection. Surface roughness features on the probe include ice accreting edges at a distal end of the probe and features arranged on a side surface of the probe which cause the airflow to increase in turbulence, thereby decreasing the temperature of the probe. Decreasing the temperature of the probe, along with increasing the critical temperature of the probe, improves ice accretion on the probe, and thereby ice detection.

BRIEF DESCRIPTION OF THE DRAWINGS

FIG. 2-1 is a side view of an ice detector made according to an embodiment of the present invention.

FIG. 2-2 is a top view of the ice detector illustrated in FIG. 2-1.

FIG. 2-3 is a rear view of the ice detector illustrated in FIGS. 2-1 and 2-2.

FIG. 3 is a plot illustrating critical temperature difference as a function of true airspeed for one exemplary ice detector in accordance with the present invention.

FIGS. 5-1 and 5-2 are diagrammatic illustrations of an alternate probe configuration in accordance with some embodiments of ice detectors of the present invention.

FIGS. 6-1 and 6-2 are diagrammatic illustrations of a second alternate probe configuration in accordance with some embodiments of ice detectors of the present invention.

FIGS. 7-1 and 7-2 are diagrammatic illustrations of a third alternate probe configuration in accordance with some embodiments of the ice detectors of the present invention.

FIGS. 8-1 and 8-2 are diagrammatic illustrations of a fourth alternate probe configuration in accordance with some embodiments of the ice detectors of the present invention.

FIGS. 9-1 though 9-4 are diagrammatic illustrations of further alternate probe modifications, in accordance with other embodiments of the ice detectors of the present invention, which can be used to increase the critical temperature of the probe.

FIGS. 10-1 through 10-5 are diagrammatic illustrations of alternate probe tip configurations that can be used in embodiments of the ice detectors of the present invention.

DETAILED DESCRIPTION OF THE PREFERRED EMBODIMENTS

Figure 1:
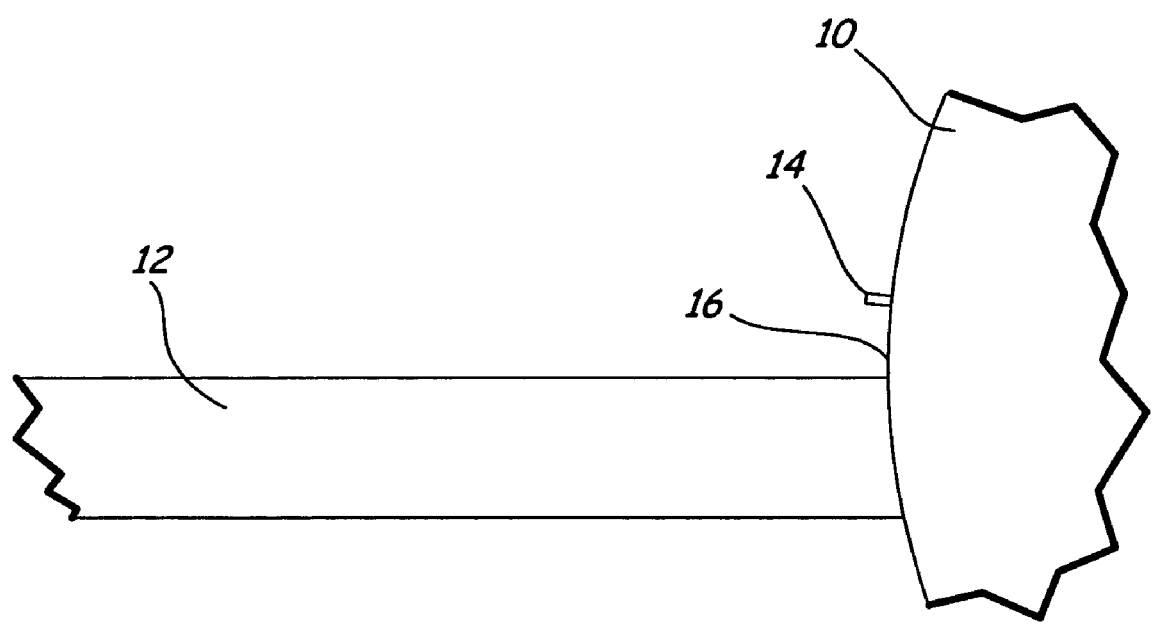
FIG. 1 is a fragmentary schematic front view of an aircraft having an ice detector made according to the present invention installed thereon.

In FIG. 1, a typical aircraft indicated at 10 is of conventional design, and includes an airfoil cross-section shaped wing 12. An ice detector probe assembly 14 (ice detector 14), made according to the present invention, is supported on the skin or outer wall 16 of the aircraft. The ice detector 14 is positioned relative to the wing 12 at a known location that is selected to provide for detection of ice as air flows past the wing and the aircraft skin 16.

Figures 1, 2:
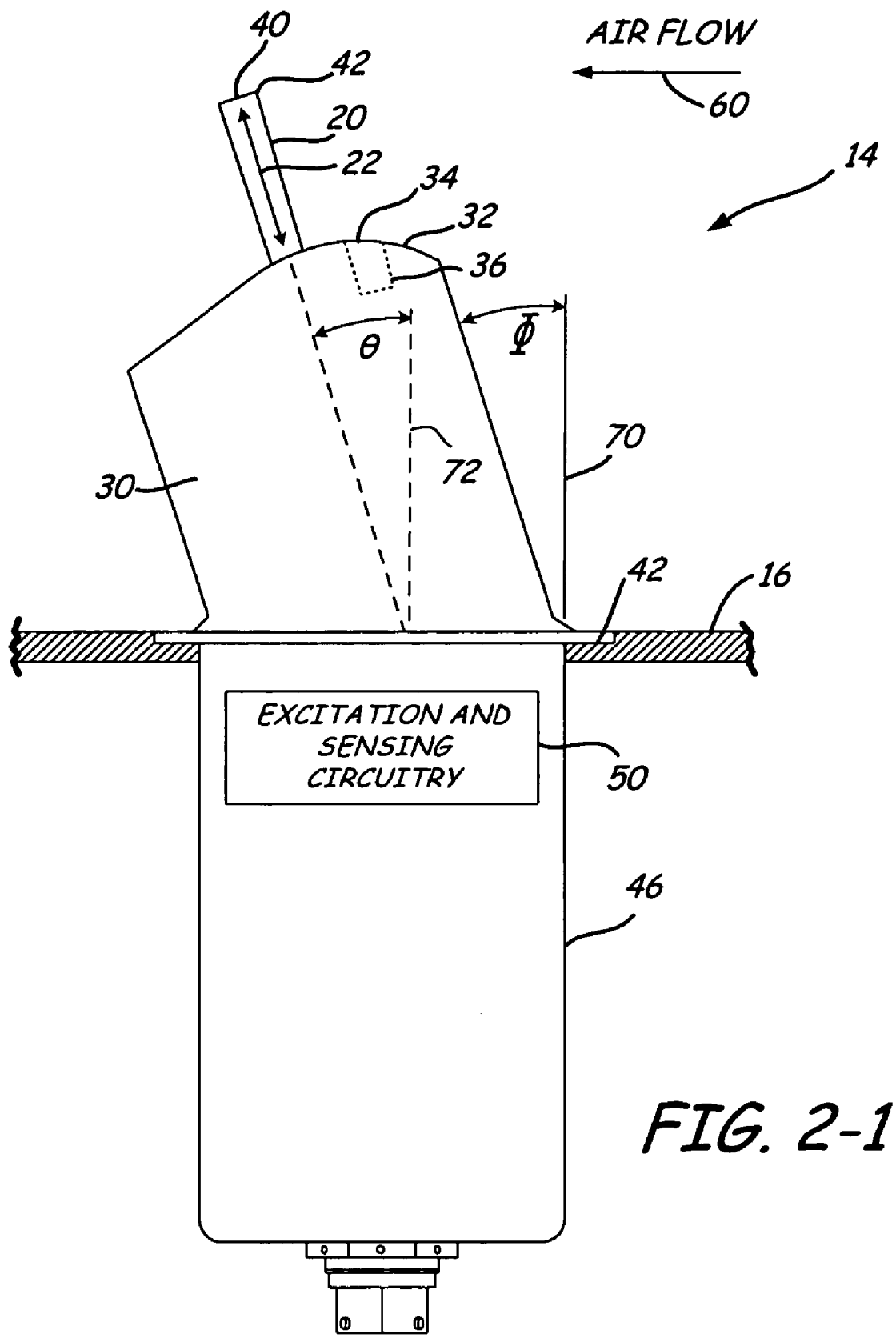
Figure 2:
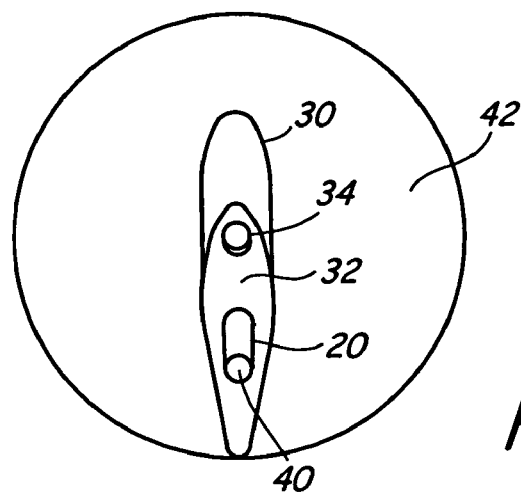
Figures 2, 3:
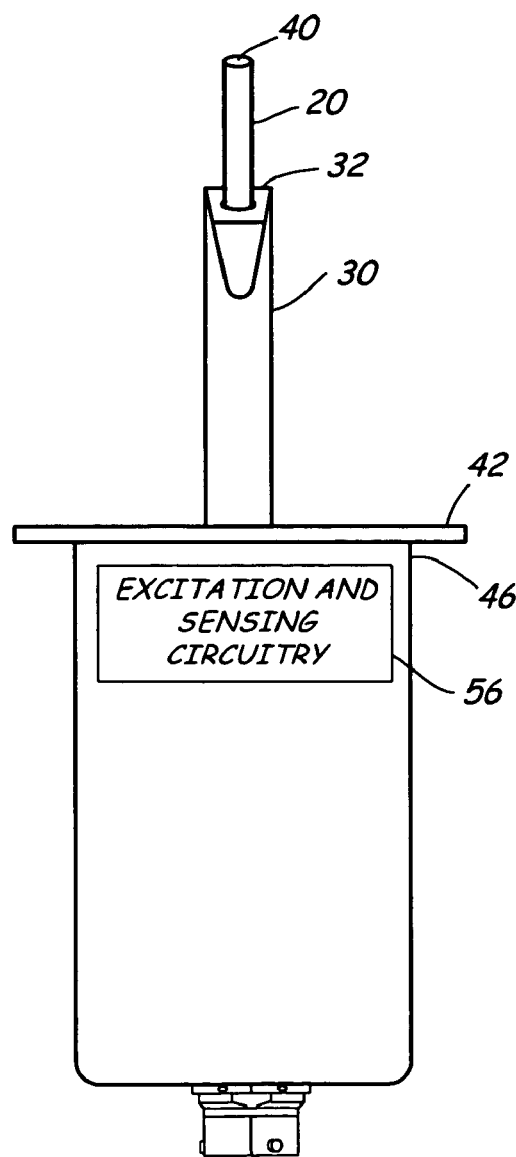
Figure 3:
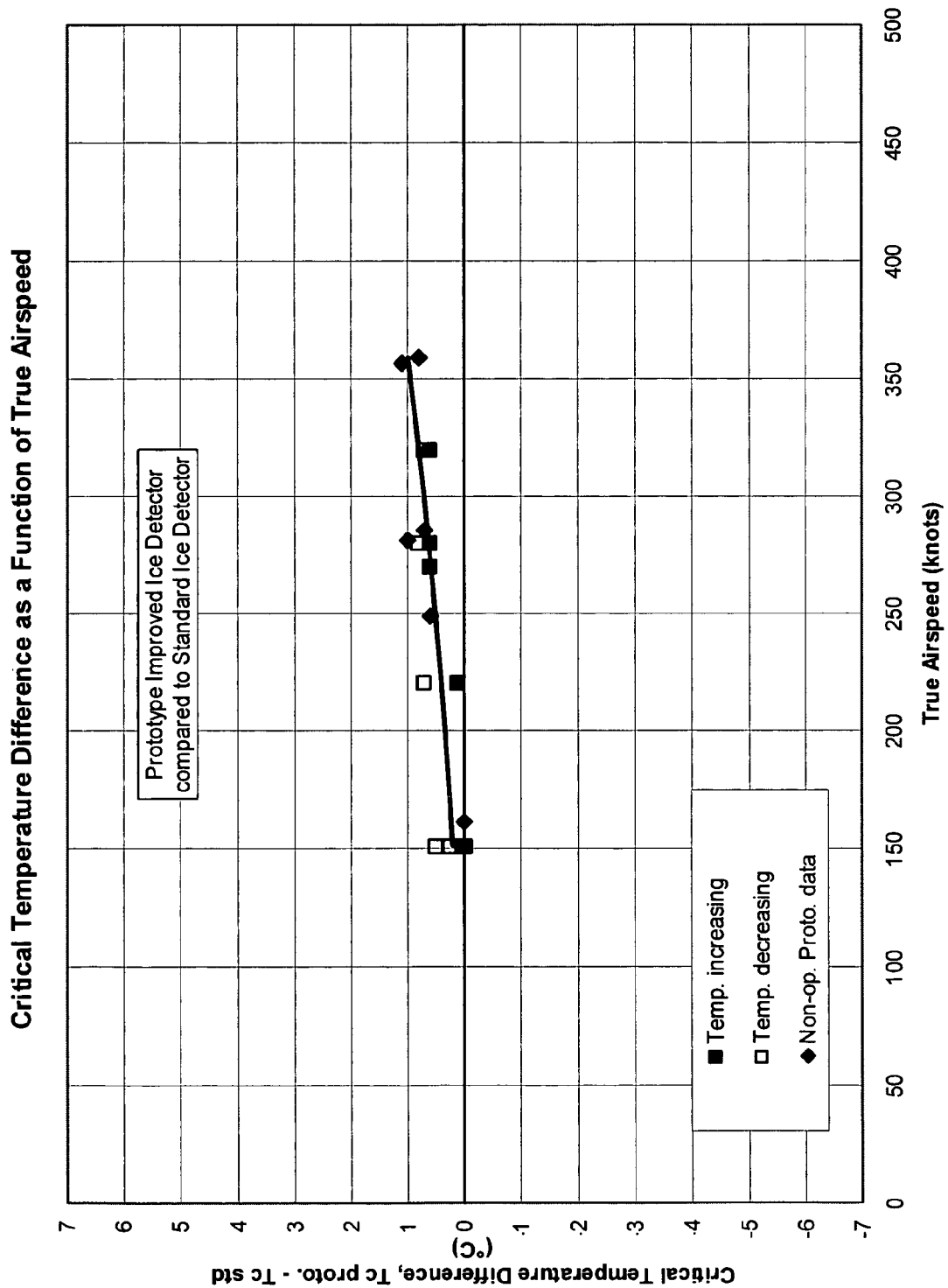

FIGS. 2-1 through 2-3 illustrate an embodiment of the ice detector 14 in accordance with the present invention. As shown, ice detector 14 includes a generally cylindrical probe 20 mounted onto a strut 30. Strut 30 is fixed to a mounting flange 42, which is supported by the aircraft skin 16 (not shown in FIGS. 2-2 and 2-3). A housing 46, typically located on the interior of the aircraft below skin 16, houses suitable excitation and sensing circuitry illustrated generally at 50, which is of conventional design.

As in conventional vibrating type ice detectors, probe 20 may be of the magnetostrictive type, and is vibrated, in directions as indicated by the double arrow 22, by the excitation porting of circuitry 50. The sensing portion of the circuitry 50 will detect any change in the natural frequency of vibration caused by ice accretion on the surface of the probe 20.

Surface temperature of an object such as probe 20 is related to the velocity at which fluid flows past it. A first aspect of the present invention is based in part upon the recognition that this effect can be used to lower the static temperature of the surface of the ice detector probe 20. To this end, strut 30 includes a curved forward upper surface 32. Curved forward upper surface 32 of strut 30 is positioned in front of probe 20 such that airflow, which approaches probe 20 traveling generally in the direction represented by arrow 60, passes by curved forward upper surface 32 before reaching probe 20. Curved forward upper surface 32 accelerates the airflow before it reaches probe 20, thereby lowering the static temperature of the surface of probe 20. This in turn increases the critical temperature of probe 20, allowing ice to form on probe 20 prior to its formation on the wings of the aircraft.

Surface roughness and surface disturbances can cause the boundary layer of a fluid near a surface to become turbulent or separate, changing the heat transfer from the surface. Generally, turbulent airflow improves heat transfer. Specifically, increasing the amount of turbulence in the fluid surrounding it increases heat transfer from a cylinder, such as probe 20. A second aspect of the present invention is based in part upon the recognition that this effect can be used to lower the overall temperature of probe 20.

In accordance with this second aspect of the present invention, a cut or step 34 is formed in strut 30 ahead of probe 20. This cut or step 34, which is also referred to as a notch, is illustrated in FIG. 2-2, and is represented diagrammatically in FIG. 2-1 by dashed lines 36. In an exemplary embodiment, the notch is a circular/cylindrical cut, step or cavity in the surface of strut 30 in front of probe 20 (in an upwind direction) such that airflow approaching probe 20 becomes more turbulent prior to reaching the probe. In a more particular embodiment, notch 34 is formed ahead of probe 20 in curved forward upper surface 32 of the strut adjacent to a point of extension of the probe from the strut. However, notch 34 need not be used in conjunction with curved forward upper surface 32 in all embodiments. Instead, either of these features can be used separately from the other.

Notch 34 creates a swirling turbulent wake that impinges on probe 20, increasing the heat transfer and lowering the overall temperature of the probe. Flow separation from the corners on the strut also increases the turbulence. While a circular or cylindrical notch is used in exemplary embodiments of the present invention, other types of notches can be used to increase the turbulence in the airflow impinging on probe 20. For example, notch shapes such as v-shaped notches, rectangular-shaped notches, etc., can be positioned ahead of probe 20 on strut 30 in order to increase the turbulence in the airflow impinging upon probe 20.

As fluid flow accelerates around a sharp corner, it separates from the surface, decreasing the local static temperature at the corner, and thus potentially increasing the local liquid water content at that point through the process of recirculation. It has been observed in wind tunnel testing that ice accretes first at the edges of square corners, such as the flat tip of an ice detector strut. A third aspect of the present invention is based in part upon the recognition that this effect can be used to accrete ice on probe 20 at a higher temperature than would otherwise be possible. As such, generally cylindrical probe 20 includes a flat tip 40 at its distal end providing generally square corners 42 at the intersection of the flat tip and the remaining surfaces of the cylinder, which are in some embodiments substantially orthogonally oriented. The flat tip probe 20 accretes ice at higher temperatures as compared to more conventional hemispherical tipped probes. In testing, accretion of ice on the tip of probe 20 has been found to have the most significant effect on the vibrating probe frequency.

It is has also been found that inclining the probe increases the critical temperature to some extent. In ice detector 14, strut 30 is inclined such that it forms an angle $\Phi$ relative to an axis 70 which is perpendicular to mounting flange 42. Probe 20 is shown as being inclined relative to axis 72 by an angle $\theta$. In some embodiments, axes 70 and 72 are parallel (i.e., both perpendicular to flange 42), and angles $\Phi$ and $\theta$ are substantially equal, but this need not be the case. As an example, angles $\Phi$ and $\theta$ range between 0° and 30° in one embodiment. However, the present invention is not limited to any specific ranges of these angles.

In the exemplary embodiment of ice detector 14 illustrated in FIGS. 2-1 through 2-3, the curved forward upper surface of strut 30, the circular notch 34 formed in strut 30, the flat tipped probe 20, and the probe inclination are used in combination to significantly increase the critical temperature of the probe. For example, the critical temperature of the probe was seen to increase by between 0.5° C. and more than 1° C., depending upon airspeed. These results were verified using icing wind tunnel testing.

Referring now to FIG. 3, shown is a plot illustrating critical temperature improvements as a function of airspeed using ice detectors of the present invention. The plot shows the critical temperature difference between prototype ice detectors of the present invention relative to a standard ice detector tested at the same time. The critical temperature difference of an operating prototype ice detector (with electronics) as shown in FIGS. 2-1 through 2-3 is represented by the square symbols in FIG. 3. The data for the operating prototype was recorded from the frequency output of the detector. The diamond symbols in FIG. 3 correspond to the critical temperature of a non-operating prototype (no electronics) ice detector of the present invention, where the data is based upon when ice was visually seen to form on the probe. The critical temperature difference results shown in FIG. 3 are based upon wind tunnel test data.

In the wind tunnel testing used to obtain the data illustrated in FIG. 3, for various airspeeds the temperature was raised until ice no longer formed on the ice detector probe, and this temperature at which ice no longer formed was recorded. Then, the temperature was lowered until ice again formed on the ice detector probe, and this temperature at which ice again formed was recorded. FIG. 3 illustrates a trend of improved (increased) critical temperatures as a second order function of airspeed for the ice detectors of the present invention.

Figure 4:
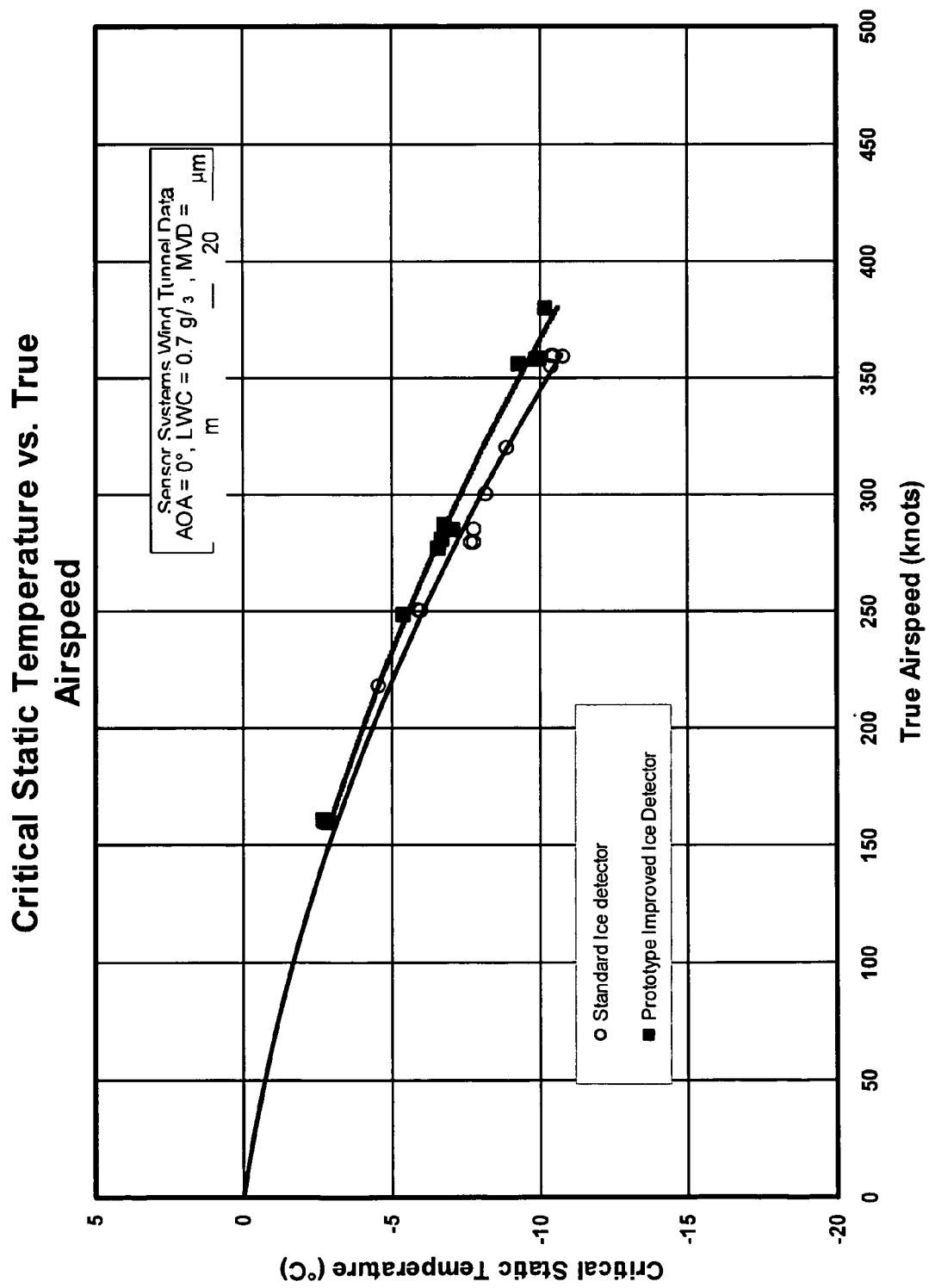
FIG. 4 is a plot illustrating critical static temperature as a function of true airspeed for both a conventional ice detector and for an ice detector in accordance with the present invention.

Referring now to FIG. 4, shown is a plot of critical static temperature as a function of airspeed for both a standard prior art ice detector (represented by circular symbols) and for an ice detector as shown in FIGS. 2-1 through 2-3 (represented by square symbols). Consistent with the results shown in FIG. 3, the plot of FIG. 4 illustrates that, as airspeed increases, the critical temperature of the ice detector of the present invention decreases at a slower rate than does the critical temperature of the prior art ice detector. Thus, the relative improvement of the ice detector of the present invention over the prior art ice detector increases as a function of airspeed.

Figures 1, 5:
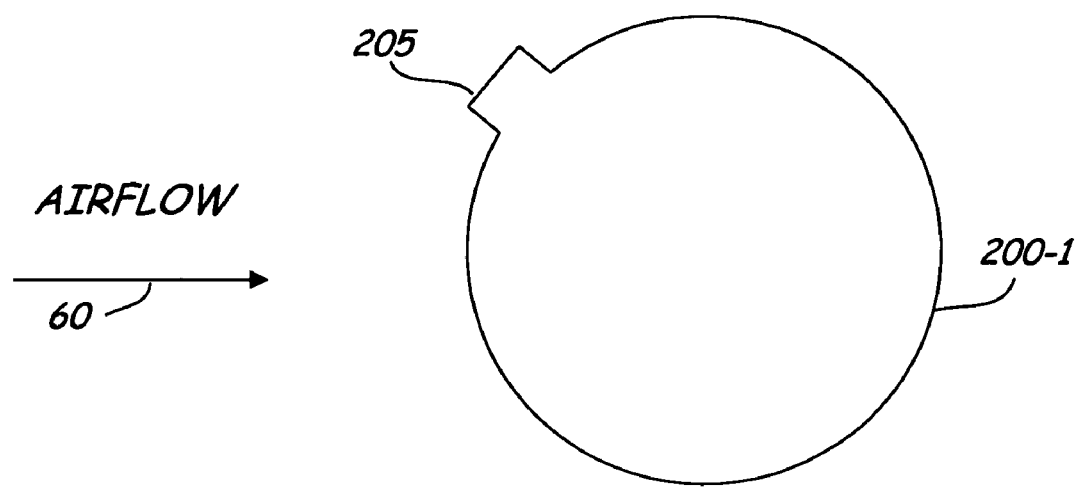
Figures 2, 5:
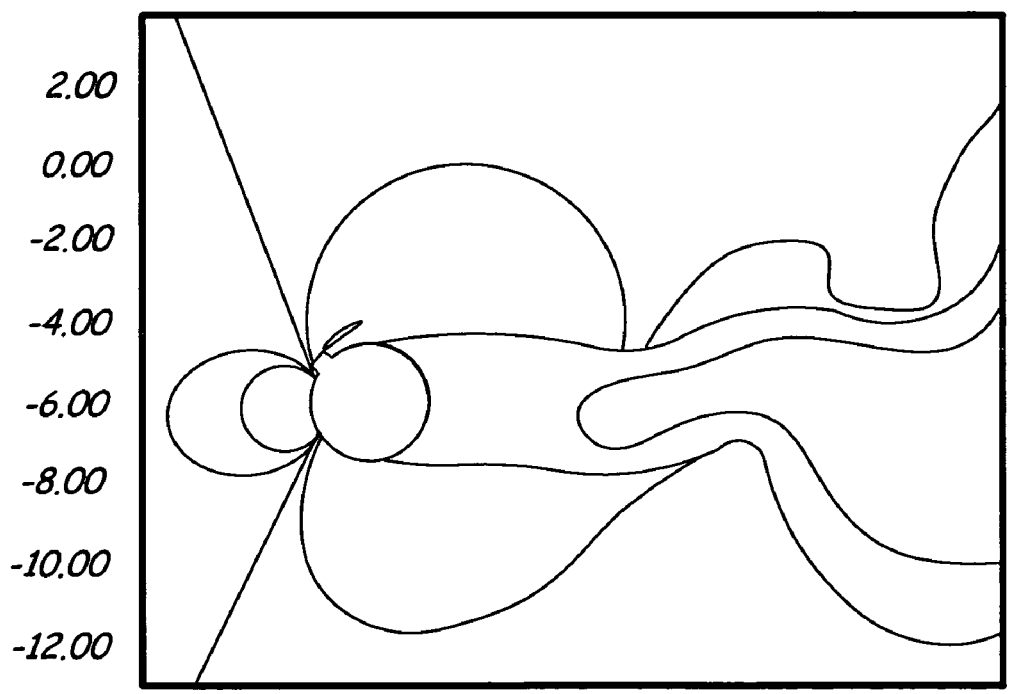

Referring now to FIGS. 5-1 and 5-2, shown is probe 200-1 which is an alternate or more particular embodiment of probe 20 described above. As discussed, the present invention utilizes the fact that surface roughness and disturbances cause the boundary layer of a fluid near a surface to become turbulent or separate, changing the heat transfer from the surface. Probe 200-1 is configured to further utilize this phenomenon.

Probe 200-1 includes a bump, ridge or other protruding surface roughness feature 205 on a surface of the cylinder. The feature 205 is located in some embodiments between 40° and 80° on either side of the centerline of the probe. The centerline of the probe is indicated in FIG. 5-1 by the airflow direction arrow 60. As can be seen in the static temperature contours of FIG. 5-2, static temperature is lowered near feature 205. This is due to the flow separation at the boundary layer caused by feature 205. Asymmetric flow lowers static temperature opposite the feature 205 relative to a standard cylindrical probe. A cold spot also develops where the boundary layer reattaches after the feature, and ice tends to accrete there due to runback and impingement influenced by the flow separation. The bump or feature itself collects ice more efficiently than the cylinder, starting a nucleation site that ices sooner.

Figures 1, 6:
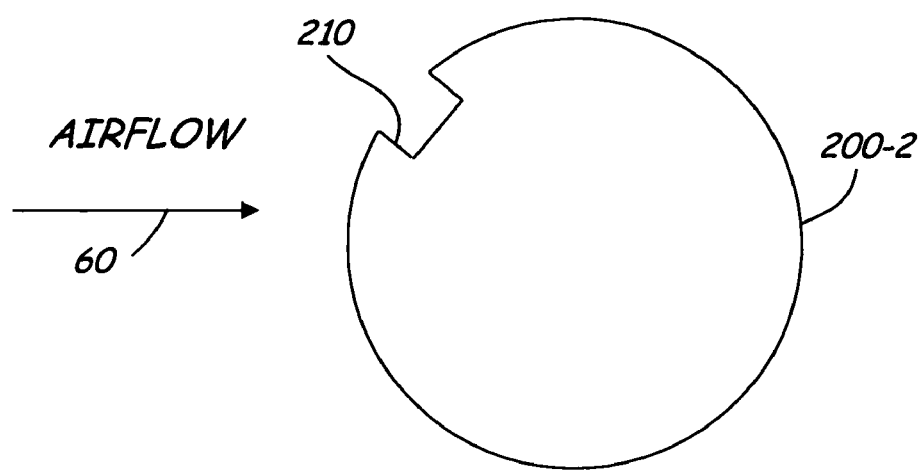
Figures 2, 6:
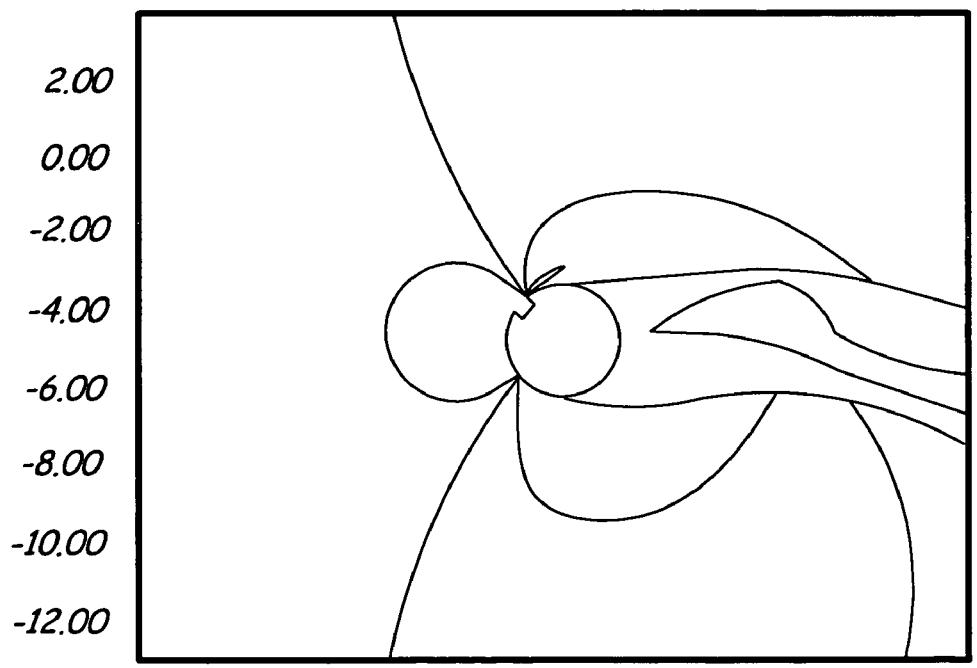
Figures 1, 7:
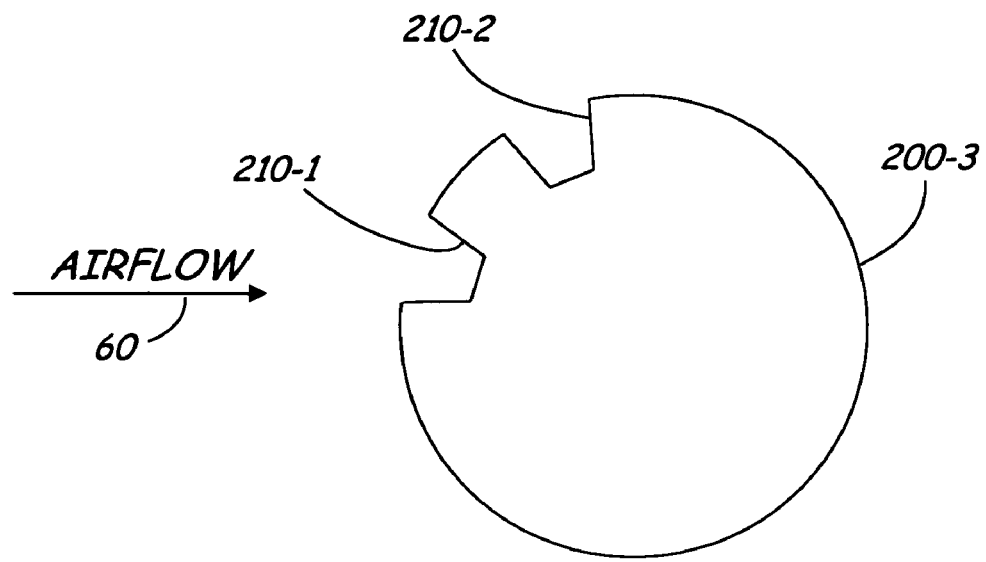
Figures 2, 7:
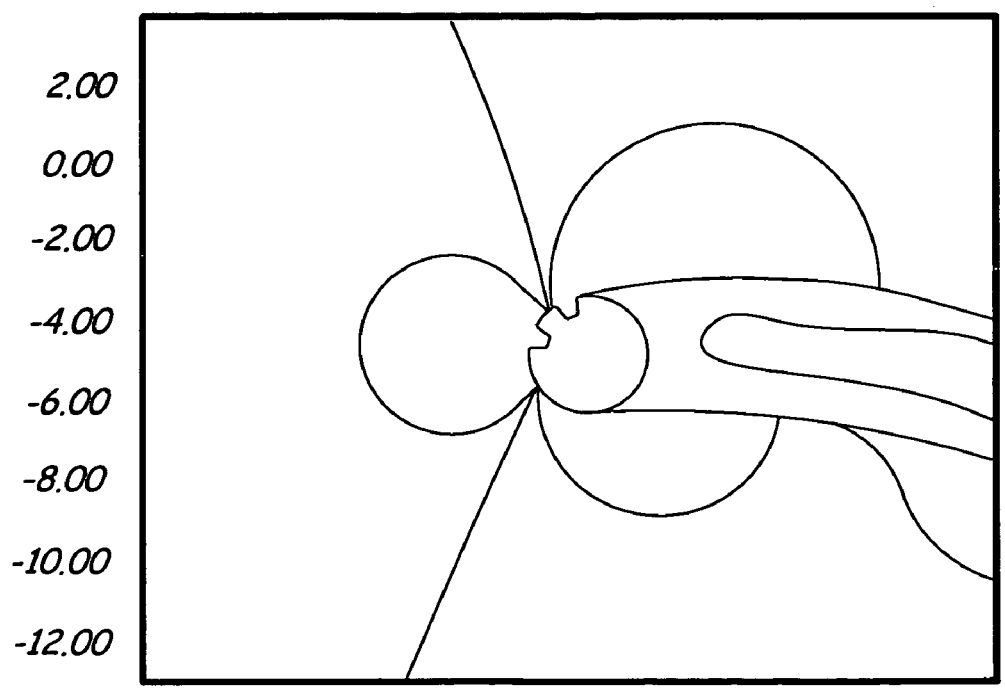

Another alternative probe 200-2 is shown in FIGS. 6-1 and 6-2. Probe 200-2 includes a surface roughness feature 210 in the form of a slot formed into the cylindrical probe body, instead of in the form of a protrusion from the probe body as was used in probe 200-1. Again, as seen in the static temperature contours of FIG. 6-2, the static temperature of the probe decreases in the vicinity of feature 210. FIGS. 7-1 and 7-2 illustrate similar improvements in a probe 200-3 having a pair of surface roughness features 210-1 and 210-2 in the form of slots formed asymmetrically into the cylindrical probe body relative to the centerline.

Figures 1, 8:
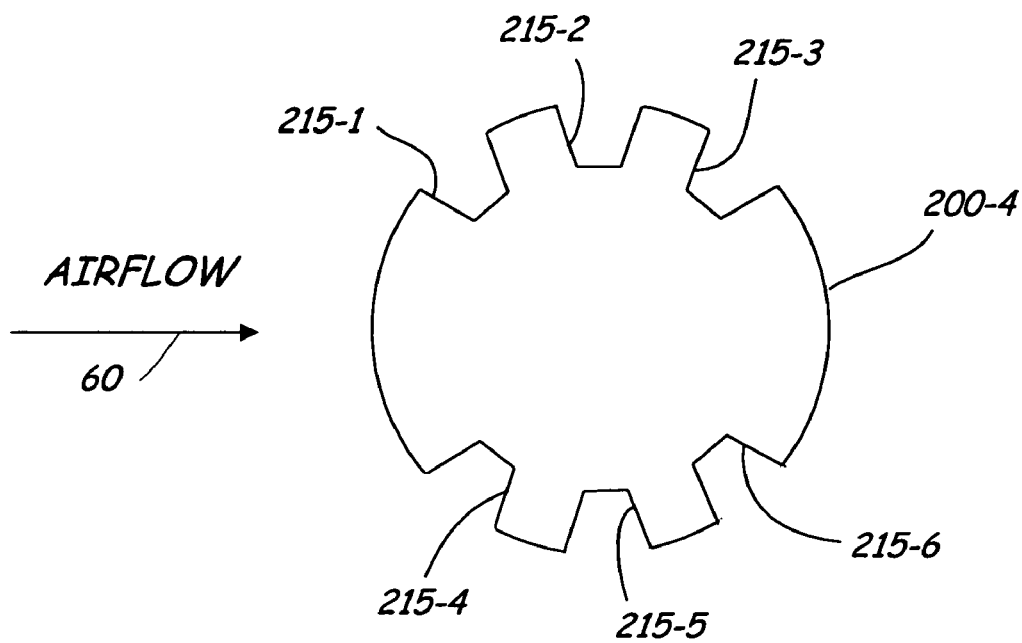
Figures 2, 8:
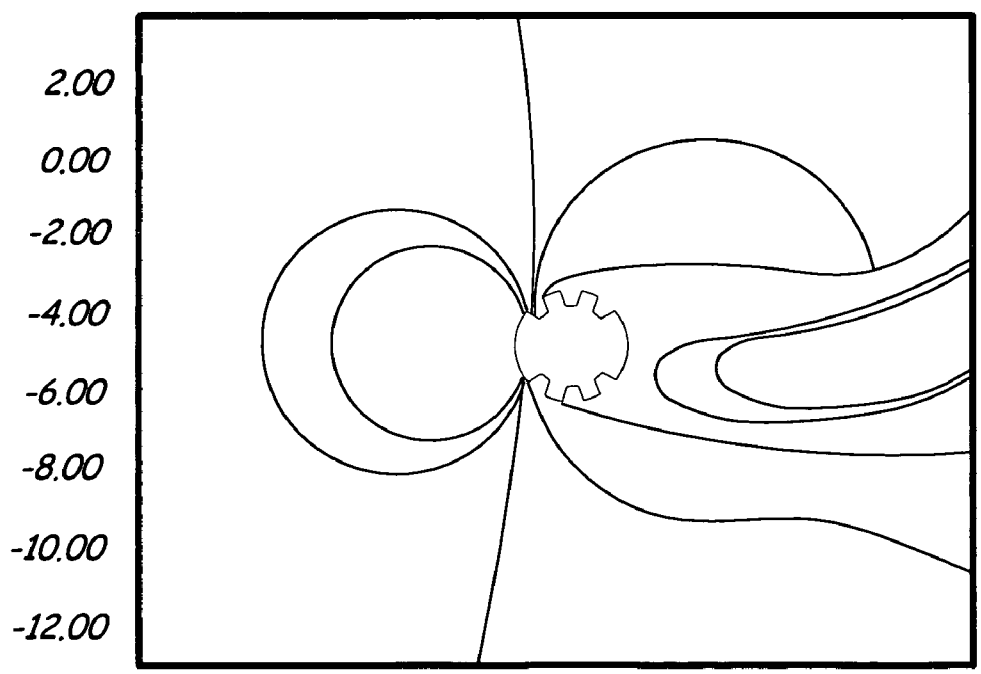

FIGS. 8-1 and 8-2 illustrate an embodiment in which probe 200-4 includes multiple dimples 215 (dimples 215-1 through 215-6 are shown) formed in the probe body. In this embodiment, the dimples are arranged symmetrically relative to the centerline of the probe represented by airflow direction arrow 60. Dimples 215 can alternatively be slots similar to those shown in probes 200-2 and 200-3, or they can be longitudinally extending like slots 210, but of a lesser length. Symmetrical arrangement of surface roughness features may be necessary in some embodiments to balance vibrational modes of the probe.

Figures 1, 9:
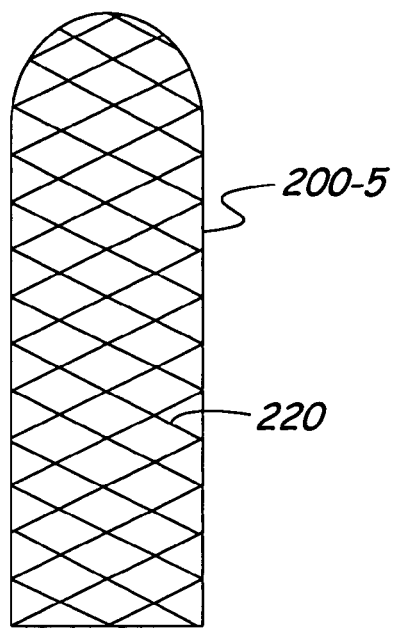
Figures 2, 9:
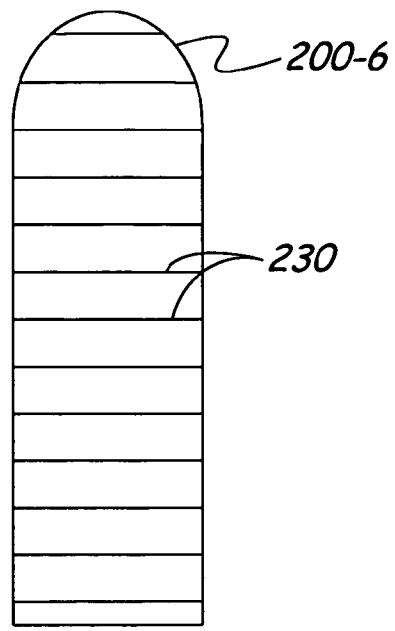
Figures 3, 9:
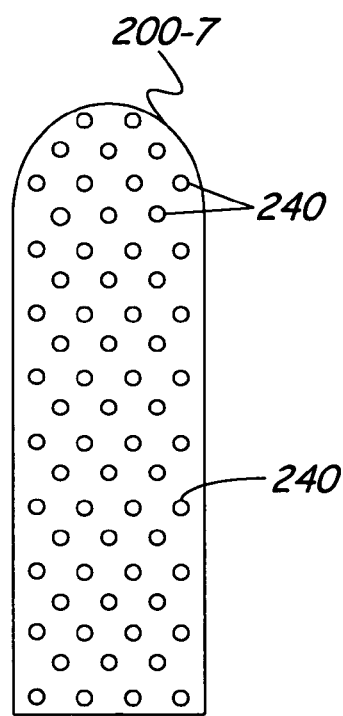
Figures 4, 9:
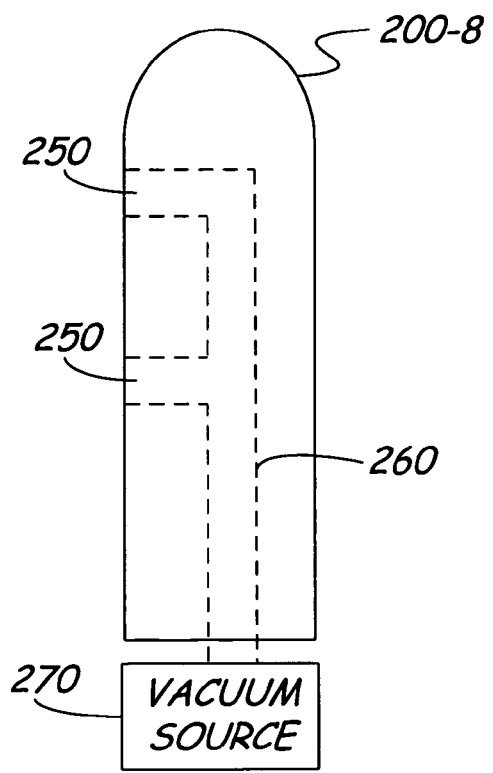

In yet other embodiments of the invention, the probes are modified with various other surface roughness features in order to cause turbulence and flow separation to cool the probe. For example FIG. 9-1 illustrates probe 200-5 including surface roughness features 220 formed in a crosshatch pattern on the probe body. Surface roughness features 220 can be machine tooled into the probe, or formed by other processes.

In another example embodiment, probe 200-6 shown in FIG. 9-2 includes surface roughness features 230 in the form of circumferentially arranged ridges formed perpendicular to the longitudinal axis of the probe. These ridges can act as cooling fins for cooling the probe. Once again, these surface roughness features can be formed using machine tooling techniques or other processes.

In yet another embodiment illustrated in FIG. 9-3, probe 200-7 includes surface roughness features 240 in the form of rows or columns of dimples or holes. In a still further embodiment illustrated in FIG. 9-4, probe 200-8 includes surface roughness features 250 in the form of holes or apertures formed in the probe body. The surface roughness features 250 can be arranged either symmetrically or asymmetrically on the probe. In some embodiments, the holes or apertures that form features 250 are open to an interior passageway 260 within probe 200-8. A vacuum source 270 or other mechanism for achieving a lower pressure within passageway 260 than exists outside of probe 200-8 can then be utilized to apply suction through the holes or apertures forming features 250. In these embodiments, the suction can be used to keep the boundary layer of air attached and laminar to the probe where desired, while boundary layer separation can be achieved elsewhere on the probe using other surface roughness features.

As discussed above with reference to FIGS. 2-1 through 2-3, modification of the tip of probe 20 from a conventional hemispherical shape to a flat tip with sharp corners improves ice accretion on the probe tip. The sharp corners accelerate the fluid flow at the corner as the fluid flow separates, decreasing the local static temperature at the edge, and perhaps increasing the local liquid water content at that point. While the flat tip probe configuration has been found to be particularly useful in promoting ice accretion, other non-hemispherical tip configurations providing sharp edges or transitions can also be used in accordance with embodiments of the invention. Also, sharp edges can be formed elsewhere on the probe body, but it has been found that the tip of a vibrating probe is most sensitive to ice accretion.

Figures 5, 10:
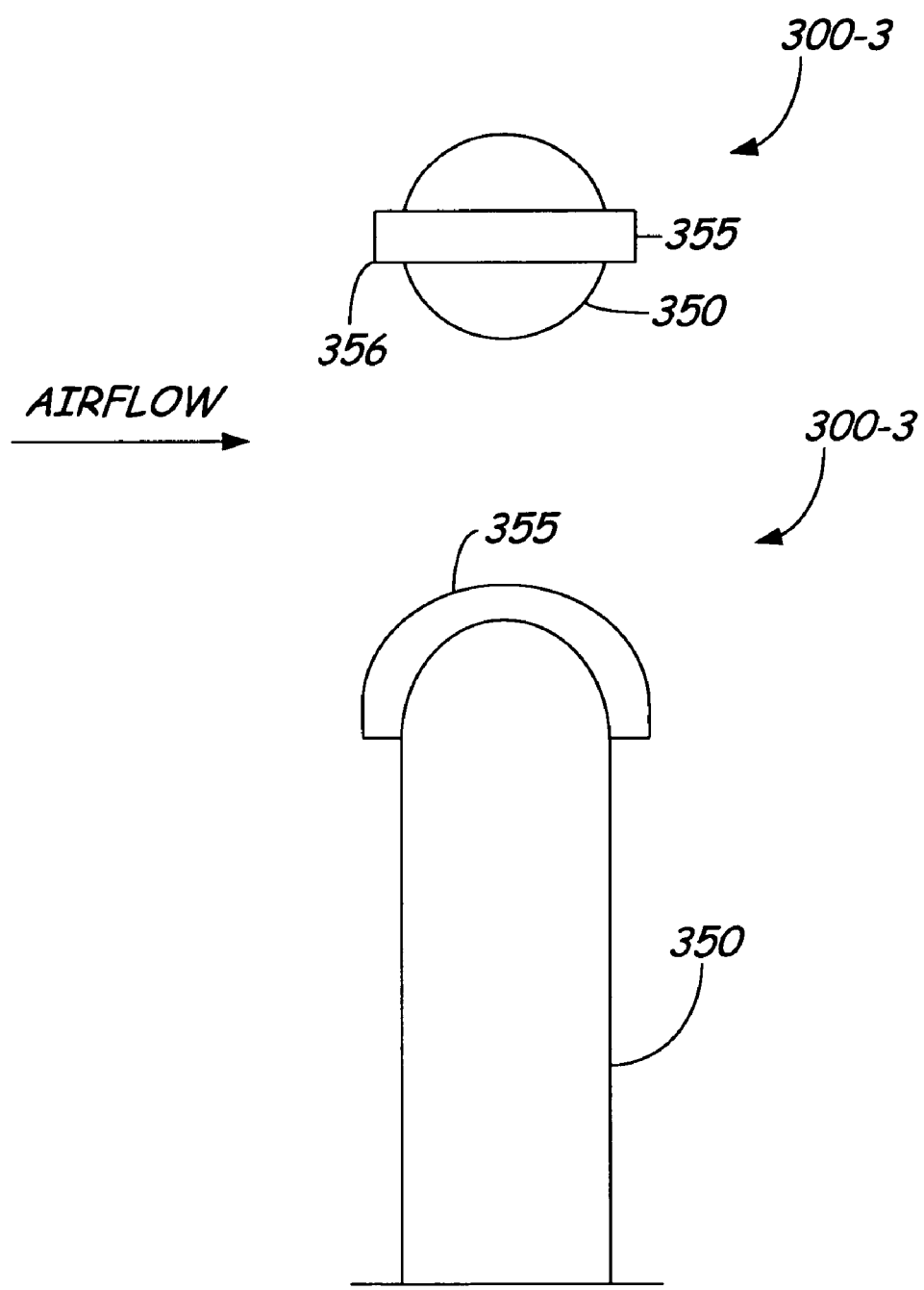

FIGS. 10-1 through 10-5 each illustrate an end and side view of different probe configurations having sharp edges or transitions at the distal tip. These configurations or features can also be considered surface roughness features since they depart from conventional cylindrical, hemispherically tipped probes having substantially smooth and continuous surfaces. However, these features largely take advantage of a different phenomenon than the surface roughness features described above. In each of these configurations, the sharp edges accrete ice at a higher ambient temperature than would be possible under identical conditions with a conventional hemispherical tipped probe. FIG. 10-1 illustrates probe 20 from FIG. 2-1 through 2-3 having flat tip 40 producing sharp edges 42.

Shown in FIG. 10-2 is a probe 300-1 which is an alternate or more particular embodiment of probe 20 described above. Probe 300-1 includes first and second longitudinally extending probe sections 305 and 310 that form a sharp edge in the form of a step 315 between the two probe sections. In one embodiment, step 315 is made by forming probe section 310 to be smaller than probe section 305. For example, each of probe sections 305 and 310 can be half of conventional cylindrical shaped probes with hemispherical shaped tips, but with probe section 310 being shorter and/or of a smaller radius than probe section 305. Other forms of steps can also be used. Further, the probe sections can be formed from different materials having differing thermal conductivities, but it is not necessary that the probe sections be formed from different materials.

Shown in FIG. 10-3 is a probe 300-2 which is an alternate or more particular embodiment of probe 20 described above. Probe 300-2 includes a probe main body 325 and a probe extension or nipple 330 extending from the top or distal end of the probe main body. Probe extension 330 has, in this example embodiment, a flat tip surface 331 and one or more side surfaces 332 that form a sharp corner 333 at their intersections. In the illustrated embodiment, probe extension 330 is a cylindrical probe extension from a conventional cylindrical shaped probe main body 325 having a hemispherical shaped tip.

Shown in FIGS. 10-4 and 10-5 is a probe 300-3 that is another alternative or more particular embodiment of probe 20. Probe 300-3 includes a probe main body 350 and a ridge member 355. From an end view of probe 300-3, ridge member 355 extends longitudinally from the top of probe main body 350 in a direction that is approximately perpendicular to the longitudinal axis of probe main body 350. Ridge member 355 can be of a variety of different shapes, and need not actually extend along a longitudinal axis.

FIG. 10-4 illustrates the probe with the ridge member 355 oriented orthogonal to the direction of airflow such that it forms a cross flow ridge. FIG. 10-5 illustrates the probe with the ridge member 355 oriented parallel to the direction of airflow such that it forms an in-line flow ridge. In either orientation, ridge member 355 provides sharp corners 356 that function as described with reference to other embodiments to accrete ice.

In the illustrated embodiment, probe main body 350 is similar to a conventional cylindrical shaped probe having a hemispherical shaped tip. In the illustrated embodiment, ridge member 355 can be formed in an arcuate or semi-circular shape as shown in FIG. 10-5. However, other shapes can be used to provide the ridge member. For example, in alternate embodiments, ridge member 355 can be of a rectangular prism shape, and portions of probe main body 350 can be removed to allow ridge member 355 to extend laterally through the probe main body.

Although the present invention has been described with reference to preferred embodiments, workers skilled in the art will recognize that changes may be made in form and detail without departing from the spirit and scope of the invention.

What is claimed is:

1. An ice detector for providing a signal indicating ice formation, the ice detector comprising:
   a probe protruding into the airflow; and
   a strut which the probe extends into the airflow, the strut having a notch formed therein in an upwind direction relative to the probe, wherein the notch is a cylindrical shaped cavity in a surface of the strut adjacent to a point of the probe from the strut, and wherein the notch is disposed and arranged such that it causes the airflow to increase in turbulence prior to reaching the probe, thereby increasing heat transfer from the probe to lower the actual temperature of the probe.

2. An ice detector for providing a signal indicating ice formation, the ice detector comprising:
   a probe protruding into an airflow; and
   a strut from which the probe extends into the airflow, the strut having a notch formed therein in an upwind direction relative to the probe, wherein the notch is a rectangular shaped cavity, and wherein the notch is disposed and arranged such that it causes the airflow to increase in turbulence prior to reaching the probe, thereby increasing heat transfer from the probe to lower the actual temperature of the probe.

3. An ice detector for providing a signal indicating ice formation, the ice detector comprising:
   a probe protruding into an airflow;
   a strut from which the probe extends into the airflow, the strut having a notch formed therein in an upwind direction relative to the probe, wherein the notch is disposed and in an arranged such that it causes the airflow to increase in turbulence prior to reaching the probe, thereby increasing heat transfer from the probe to lower the actual temperature of the probe;
   a mounting flange to which the strut is coupled, the mounting flange being configured to be fixed to a surface of an aircraft, wherein the probe extends from the strut at an inclined angle relative to a direction that is perpendicular to the mounting flange.

4. An ice detector for providing a signal indicating ice formation, the ice detector comprising:
   a probe protruding into an airflow, the probe having a longitudinally extending shape and a flat tip at a distal end of the probe providing an ice accreting edge; and
   a strut from which the probe extends into the airflow, the strut having a notch formed therein an upwind direction relative to the probe, wherein the notch is disposed and arranged such that it causes the airflow to increase in turbulence prior to reaching the probe, thereby increasing heat transfer from the probe to lower the actual temperature of the probe.

5. An ice detector for providing a signal indicating ice formation, the ice detector comprising:
   a probe protruding into an airflow, the probe having a longitudinally extending shape and a flat tip at a distal end of the probe providing an ice accreting edge;
   a strut from which the probe extends into the airflow, the strut having a curved surface adjacent a point of extension of the probe from the strut, the curve surface being positioned in an upwind direction relative to the probe to accelerate the airflow before it reaches the probe.

6. An ice detector for providing a signal indicating ice formation, the ice detector comprising:
   a probe protruding into an airflow;
   a strut from which the probe extends into the airflow, the strut having a curved surface adjacent a point of extension of the probe from the strut, the curved surface being positioned in an upwind direction relative to the probe to accelerate the airflow before it reaches the probe, wherein the strut has a notch formed therein in the upwind direction relative to the probe, wherein the notch is formed as a cylindrical shape cavity in the curved surface and is disposed and arranged such that it causes the airflow to increase in turbulence prior to reaching the probe, thereby increasing heat transfer from the probe to lower an actual temperature of the probe.

* * * * *

UNITED STATES PATENT AND TRADEMARK OFFICE
CERTIFICATE OF CORRECTION

PATENT NO.         : 7,104,502 B2
APPLICATION NO. : 10/814939
DATED              : September 12, 2006
INVENTOR(S)        : John T. Otto et al.

It is certified that error appears in the above-identified patent and that said Letters Patent is hereby corrected as shown below:

Column 7, line 60, "a strut which" should read --a strut from which--.
Column 7, beginning on line 63, "adjacent to a point of the probe" should read --adjacent to a point of extension of the probe--.

Signed and Sealed this

Twelfth Day of December, 2006

JON W. DUDAS
*Director of the United States Patent and Trademark Office*